(12) United States Patent
Yin et al.

(10) Patent No.: US 12,550,184 B2
(45) Date of Patent: Feb. 10, 2026

(54) WIRELESS COMMUNICATION METHOD, USER EQUIPMENT, AND BASE STATION

(71) Applicant: Huizhou TCL Cloud Internet Corporation Technology Co., Ltd., Guangdong (CN)

(72) Inventors: Xiaoxue Yin, Guangdong (CN); Jia Sheng, Guangdong (CN)

(73) Assignee: Huizhou TCL Cloud Internet Corporation Technology Co., Ltd., Guangdong (CN)

( * ) Notice: Subject to any disclaimer, the term of this patent is extended or adjusted under 35 U.S.C. 154(b) by 269 days.

(21) Appl. No.: 18/562,864

(22) PCT Filed: Jul. 12, 2021

(86) PCT No.: PCT/CN2021/105770
§ 371 (c)(1),
(2) Date: Nov. 21, 2023

(87) PCT Pub. No.: WO2023/283763
PCT Pub. Date: Jan. 19, 2023

(65) Prior Publication Data
US 2024/0224319 A1 Jul. 4, 2024

(51) Int. Cl.
*H04W 72/21* (2023.01)
*H04W 72/566* (2023.01)
*H04W 52/36* (2009.01)

(52) U.S. Cl.
CPC ......... *H04W 72/569* (2023.01); *H04W 72/21* (2023.01); *H04W 52/365* (2013.01)

(58) Field of Classification Search
CPC . H04W 72/569; H04W 72/21; H04W 52/365; H04W 72/56; H04W 72/23;
(Continued)

(56) References Cited

U.S. PATENT DOCUMENTS

2012/0113962 A1* 5/2012 Jen .......................... H04L 5/001
370/336
2013/0148592 A1* 6/2013 Noh ..................... H04L 5/0053
370/329
(Continued)

FOREIGN PATENT DOCUMENTS

| CN | 110536464 A | 12/2019 |
| WO | 2020206226 A1 | 10/2020 |
| WO | 2021137554 A1 | 7/2021 |

OTHER PUBLICATIONS

European Search Report in European application No. 21949561.1, mailed on Feb. 10, 2025.
(Continued)

*Primary Examiner* — Nimesh Patel
(74) *Attorney, Agent, or Firm* — PV IP PC; Wei Te Chung

(57) ABSTRACT

A wireless communication method executable in a user equipment (UE) includes: performing multiplexing of at least two uplink (UL) transmission channels with a low priority; determining a final transmission channel with the low priority after the multiplexing of the at least two UL transmission channels with the low priority; in response to the final transmission channel with the low priority overlapping at least one UL transmission channel with a high priority, performing multiplexing of the final transmission channel with the low priority and the at least one UL transmission channel with the high priority, or performing PUCCH/PUSCH transmissions.

18 Claims, 4 Drawing Sheets

(58) Field of Classification Search
CPC ......... H04W 72/1268; H04W 72/0453; H04W 72/04; H04W 52/146; H04W 72/20; H04W 88/02; H04W 72/12; H04W 48/12; H04W 72/02; H04L 5/001; H04L 5/0042; H04L 5/0053; H04L 5/0094; H04L 5/0048; H04L 5/0044; H04L 5/0023; H04L 5/0037; H04L 5/005; H04L 25/0224; H04L 25/0228; H04L 27/2601; H04L 5/0005; H04L 5/00; H04B 7/024; H04B 7/0452; H04B 7/0626; H04B 7/0617; H04B 7/06952; H04B 17/11; H04B 17/12; H04B 7/0408; H04B 7/0413; H04B 7/0691; H04B 7/04; Y02D 30/70; H04J 11/00; H04J 11/0053; H04J 11/0026; H04J 11/003; H04J 3/00; H04J 3/1694; H04J 1/00; H04J 11/0023
See application file for complete search history.

(56) References Cited

U.S. PATENT DOCUMENTS

| | | | | |
|---|---|---|---|---|
| 2014/0307597 | A1* | 10/2014 | Kim | H04L 5/1469 370/280 |
| 2020/0053761 | A1 | 2/2020 | Hosseini et al. | |
| 2020/0322972 | A1* | 10/2020 | Hosseini | H04W 72/23 |
| 2021/0067220 | A1* | 3/2021 | Abdelghaffar | H04L 5/0023 |
| 2023/0007599 | A1* | 1/2023 | Lim | H04L 1/08 |
| 2023/0105294 | A1* | 4/2023 | Park | H04L 1/1819 370/329 |
| 2024/0322960 | A1* | 9/2024 | Zhang | H04W 52/243 |

OTHER PUBLICATIONS

NPL1: Huawei et al: "Intra-UE multiplexing enhancements", 3GPP Draft; R1-2104264, [retrieved on May 12, 2021].
NPL2: Nokia et al: "On UL intra-UE multiplexing and prioritization enhancements", 3GPP Draft; R1-2104310, [retrieved on May 10, 2021].
NPL3: Qualcomm Incorporated: "Intra-UE multiplexing and prioritization for IOT and URLLC", 3GPP Draft; R1-2104666, [retrieved on May 12, 2021].
International Search Report in International application No. PCT/CN2021/105770,mailed on Mar. 28, 2022.
Written Opinion of the International Search Authority in International application No. PCT/CN2021/105770,mailed on Mar. 28, 2022.
SONY. "Considerations on intra-UE UL multiplexing & prioritisation" 3GPP TSG RAN WG1 #102-e, R1-2005572, Aug. 28, 2020(Aug. 28, 2020) section 2.

* cited by examiner

WIRELESS COMMUNICATION METHOD, USER EQUIPMENT, AND BASE STATION

TECHNICAL FIELD

The present disclosure relates to the field of communication systems, and more particularly, to a wireless communication method, a user equipment, and a base station.

BACKGROUND ART

Wireless communication systems and networks have developed towards being a broadband and mobile system. In cellular wireless communication systems, a user equipment (UE) is connected by a wireless link to a radio access network (RAN). The RAN comprises a set of base stations (BSs) which provide wireless links to the UEs located in cells covered by the base station, and an interface to a core network (CN) which provides overall network control. As will be appreciated the RAN and CN each conduct respective functions in relation to the overall network. The 3rd Generation Partnership Project (3GPP) has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

Ultra-reliable low-latency communication (URLLC), is one of several different types of use cases supported by the 5G NR standard, as stipulated by 3GPP Release 15. URLLC is a communication service for successfully delivering packets with stringent requirements, particularly in terms of availability, latency, and reliability. URLLC is developed to support the emerging applications and services, such as wireless control and automation in industrial factory environments, inter-vehicular communications for improved safety and efficiency, and the tactile internet. Thus, URLLC is important for 5G as it supports verticals bringing new business to the whole telecommunication industry.

One of the key features of URLLC is the low latency. Low latency is important for gadgets that, say, drive themselves, or perform prostate surgeries. Low latency allows a network to be optimized for processing incredibly large amounts of data with minimal delay (or, latency). The networks need to adapt to a broad amount of changing data in real time. 5G will enable this service to function. URLLC is, arguably, the most promising addition to upcoming 5G capabilities, but it will also be the hardest to secure; URLLC requires a quality of service (QoS) totally different from mobile broadband services. It will provide networks with instantaneous and intelligent systems, though it will require transitioning out of the core network.

The design of a low-latency and high-reliability service involves several components: integrated frame structure, incredibly fast turnaround, efficient control and data resource sharing, grant-free based uplink transmission, and advanced channel coding schemes. Uplink grant-free structures guarantee a reduction in a user equipment (UE) latency transmission through avoiding the middle-man process of acquiring a dedicated scheduling grant.

Technical Problem

Uplink transmission conflicts within a UE have been an important topic of discussion since Release 15. Each release focuses on different topics. In release 17, the main discussion focuses on multiplexing methods between UL transmissions with different priories. In the previous meeting, it was agreed to support simultaneous physical uplink control channel/physical uplink shared channel (PUCCH/PUSCH) transmissions on different cells at least for inter-band carrier aggregation (CA). However, the details for how to perform the simultaneous PUCCH/PUSCH transmissions have not concluded.

Technical Solution

An object of the present disclosure is to propose a wireless communication method, a user equipment, and a base station.

A first aspect of the present disclosure provides a wireless communication method executable in a user equipment (UE), including: performing multiplexing of at least two uplink (UL) transmission channels with a low priority; determining a final transmission channel with the low priority after the multiplexing of the at least two UL transmission channels with the low priority; and in response to the final transmission channel with the low priority overlapping at least one UL transmission channel with a high priority, performing multiplexing of the final transmission channel with the low priority and the at least one UL transmission channel with the high priority, or performing PUCCH/PUSCH transmissions.

A second aspect of the present disclosure provides a wireless communication method executable in a base station (BS), including: receiving uplink data from a user equipment (UE), wherein the UE performs operations comprising: performing multiplexing of at least two uplink (UL) transmission channels; determining a final transmission channel with the low priority after the multiplexing of the at least two UL transmission channels with the low priority; and in response to the final transmission channel with the low priority overlapping at least one UL transmission channel with a high priority, performing multiplexing of the final transmission channel with the low priority and the at least one UL transmission channel with the high priority, or performing PUCCH/PUSCH transmissions.

A third aspect of the present disclosure provides a user equipment including a transceiver and a processor connected with the transceiver. The processor is configured to execute operations including: performing multiplexing of at least two uplink (UL) transmission channels with a low priority; determining a final transmission channel with the low priority after the multiplexing of the at least two UL transmission channels with the low priority; and in response to the final transmission channel with the low priority overlapping at least one UL transmission channel with a high priority, performing multiplexing of the final transmission channel with the low priority and the at least one UL transmission channel with the high priority, or performing PUCCH/PUSCH transmissions.

A fourth aspect of the present disclosure provides a base station including a transceiver and a processor connected with the transceiver. The processor is configured to execute receiving uplink data from a user equipment (UE), wherein the UE performs operations comprising: performing multiplexing of at least two uplink (UL) transmission channels with a low priority; determining a final transmission channel with the low priority after the multiplexing of the at least two UL transmission channels with the low priority; and in response to the final transmission channel with the low priority overlapping at least one UL transmission channel with a high priority, performing multiplexing of the final transmission channel with the low priority and the at least one UL transmission channel with the high priority, or performing PUCCH/PUSCH transmissions.

The disclosed method may be implemented in a chip. The chip may include a processor, configured to call and run a computer program stored in a memory, to cause a device in which the chip is installed to execute the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may include at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as computer program product that causes a computer to execute the disclosed method.

The disclosed method may be programmed as computer program that causes a computer to execute the disclosed method.

Advantageous Effects

The present disclosure can solve the problem of multiplexing behaviour for collision(s) among uplink transmissions with different priorities. The present disclosure provides several alternative solutions for different scenarios including the processing order among multiplexing, prioritization and simultaneous PUCCH/PUSCH transmissions. In addition, the present disclosure provides new PHR (Power Headroom Report) types if simultaneous PUCCH/PUSCH transmissions are enabled. The wireless communication method, the user equipment, and the base station provided by the present disclosure can both guarantee the reliability and latency requirement of high priority transmission and improve the transmit performance of low priority transmission.

DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the present disclosure.

Figure 1:
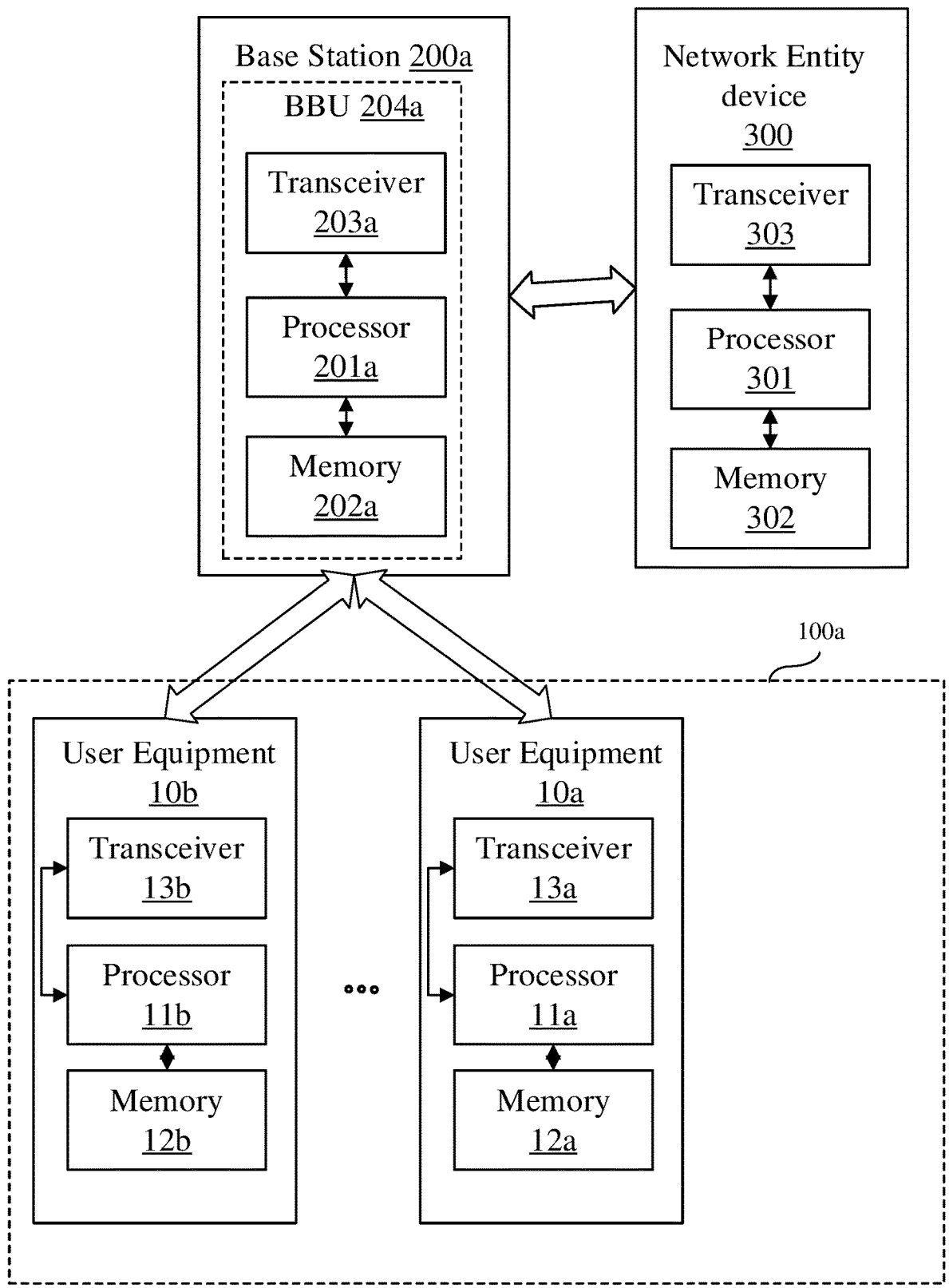
FIG. 1 is a schematic diagram showing a telecommunication system.

With reference to FIG. 1, a telecommunication system including a group 100a of a plurality of UEs, a base station (BS) 200a, and a network entity device 300 executes the disclosed method according to an embodiment of the present disclosure. The group 100a of a plurality of UEs may include a UE 10a, a UE 10b, and other UEs. FIG. 1 is shown for illustrative not limiting, and the system may include more UEs, BSs, and CN entities. Connections between devices and device components are shown as lines and arrows in the figure. Connections between devices may be realized by wireless connections. Connections between device components may be realized by wirelines, buses, traces, cables or optical fabrics. The UE 10a may include a processor 11a, a memory 12a, and a transceiver 13a. The UE 10b may include a processor 11b, a memory 12b, and a transceiver 13b. The base station 200a may include a baseband unit (BBU) 204a. The base band unit 204a may include a processor 201a, a memory 202a, and a transceiver 203a. The network entity device 300 may include a processor 301, a memory 302, and a transceiver 303. Each of the processors 11a, 11b, 201a, and 301 may be configured to implement proposed functions, procedures and/or methods described in the description. Layers of radio interface protocol may be implemented in the processors 11a, 11b, 201a, and 301. Each of the memories 12a, 12b, 202a, and 302 operatively stores a variety of programs and information to operate a connected processor. Each of the transceivers 13a, 13b, 203a, and 303 is operatively coupled with a connected processor, transmits and/or receives radio signals or wireline signals. The UE 10a may be in communication with the UE 10b through a sidelink. The base station 200a may be an eNB, a gNB, or one of other types of radio nodes.

Each of the processors 11a, 11b, 201a, and 301 may include a central processing unit (CPU), an application-specific integrated circuits (ASICs), other chipsets, logic circuits and/or data processing devices. Each of the memories 12a, 12b, 202a, and 302 may include a read-only memory (ROM), a random access memory (RAM), a flash memory, a memory card, a storage medium and/or other storage devices. Each of the transceivers 13a, 13b, 203a, and 303 may include baseband circuitry and radio frequency (RF) circuitry to process radio frequency signals. When the embodiments are implemented in software, the techniques described herein can be implemented with modules, units, procedures, functions, entities and so on, that perform the functions described herein. The modules can be stored in a memory and executed by the processors. The memory can be implemented within a processor or external to the processor, in which those can be communicatively coupled to the processor via various means are known in the art.

The network entity device 300 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and network exposure function (NEF).

The present disclosure aims to solve the problem of multiplexing behaviour for collision(s) among uplink (UL) transmissions with different priorities. The detailed solutions for multiplexing between UL transmissions with different priorities and simultaneous PUCCH/PUSCH transmissions are agreed to be discussed in release 17. It is evident that always dropping/skipping a low priority channel highly impacts the system overall latency and unnecessarily inefficient. In release 17, regarding the existing procedure for UL transmission collision handling, the processing order of multiplexing for uplink transmissions with different priorities, simultaneous transmission and prioritization are not concluded. Furthermore, in the current 3GPP meeting, the conclusion is only illustrated that simultaneous PUCCH/PUSCH transmissions are supported, but the details of exactly how it can be supported have not yet been concluded.

To this end, the present disclosure provides several alternative solutions for different scenarios, including the processing order among multiplexing, prioritization and simultaneous PUCCH/PUSCH transmissions when at least one collision exists between UL transmissions.

Figure 2:
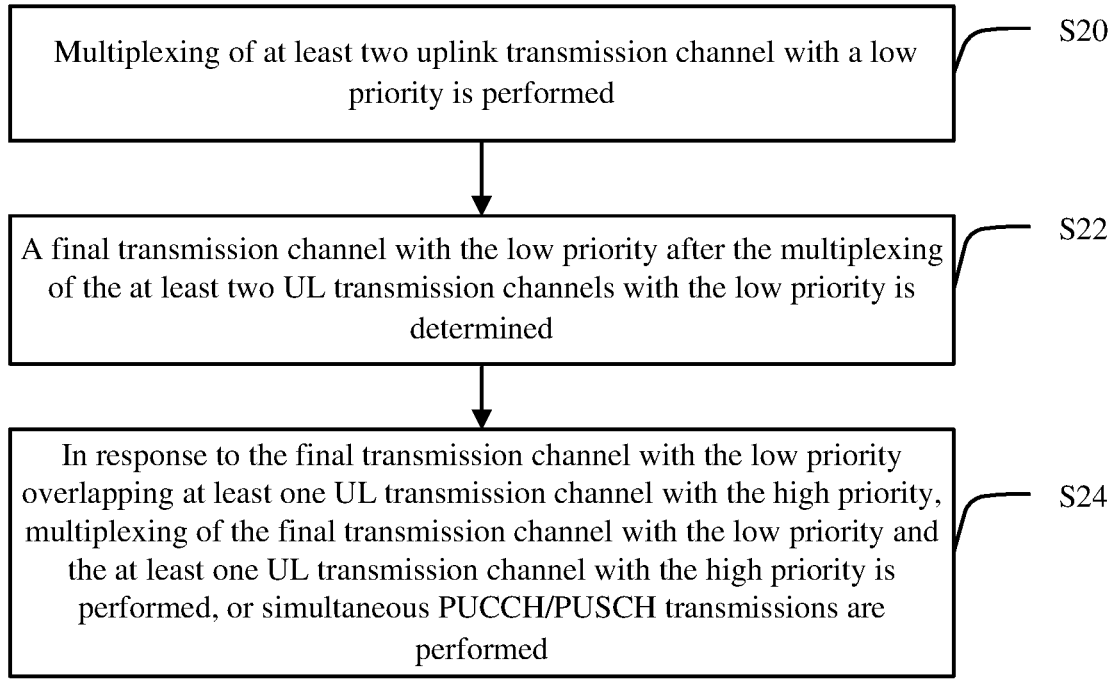
FIG. 2 is a schematic diagram showing a wireless communication method executable in a user equipment according to an embodiment of the present disclosure.

Please refer to FIG. 2. FIG. 2 is a schematic diagram showing a wireless communication method executable in a user equipment (UE) according to an embodiment of the present disclosure. In the present embodiment, the simultaneous PUCCH/PUSCH transmissions with the same priority are not supported.

In operation S20, multiplexing of at least two uplink (UL) transmission channels with a low priority is performed.

It is noted that each of the at least two UL transmission channels with the low priority can be a PUCCH or a PUSCH.

In detail, the multiplexing of the at least two UL transmission channels with the low priority is performed assuming that no overlapping UL transmission channels with a high priority.

In operation S22, a final transmission channel with the low priority after the multiplexing of the at least two UL transmission channels with the low priority is determined.

In operation S24, in response to the final transmission channel with the low priority overlapping at least one UL transmission channel with the high priority, multiplexing of the final transmission channel with the low priority and the at least one UL transmission channel with the high priority is performed, or simultaneous PUCCH/PUSCH transmissions are performed.

It is noted that the at least one UL transmission channel with the high priority can be a PUCCH or a PUSCH. Furthermore, each of the simultaneous PUCCH/PUSCH transmissions can be a PUCCH transmission or a PUSCH transmission.

In response to the final transmission channel with the low priority not overlapping the at least one UL transmission channel with the high priority, the multiplexing of the final transmission channel with the low priority and the at least one UL transmission channel with the high priority is not performed, and the simultaneous PUCCH/PUSCH transmissions are not performed, either.

In detail, it is determined whether the final transmission channel with the low priority overlaps the at least one UL transmission channel with the high priority before and/or after multiplexing of UL transmission channels with the high priority.

In one situation, the multiplexing of the final transmission channel with the low priority and the at least one UL transmission channel with the high priority is considered firstly. In another situation, the simultaneous PUCCH/PUSCH transmissions are considered firstly.

For the situation that the multiplexing of the final transmission channel with the low priority and the at least one UL transmission channel with the high priority is considered firstly, when the final transmission channel with the low priority overlaps the at least one UL transmission channel with the high priority, the multiplexing of the final transmission channel with the low priority and the at least one UL transmission channel with the high priority is performed in response to a multiplexing condition being met. It is noted that the multiplexing condition can be referred to the known standards or established in the future. The present disclosure is not limited thereto.

When the final transmission channel with the low priority overlaps the at least one UL transmission channel with the high priority, the simultaneous PUCCH/PUSCH transmissions are performed in response to the multiplexing condition not being met and a simultaneous transmission condition being met. In detail, the final transmission channel with the low priority and the at least one UL transmission channel with the high priority are transmitted simultaneously. It is noted that the simultaneous transmission condition can be referred to the known standards or established in the future. The present disclosure is not limited thereto.

When the final transmission channel with the low priority overlaps the at least one UL transmission channel with the high priority, the final transmission channel with the low priority is dropped in response to the multiplexing condition not being met and the simultaneous transmission condition not being met.

It is noted that the simultaneous transmission condition can be configured by a radio resource control (RRC) parameter.

Figure 3:
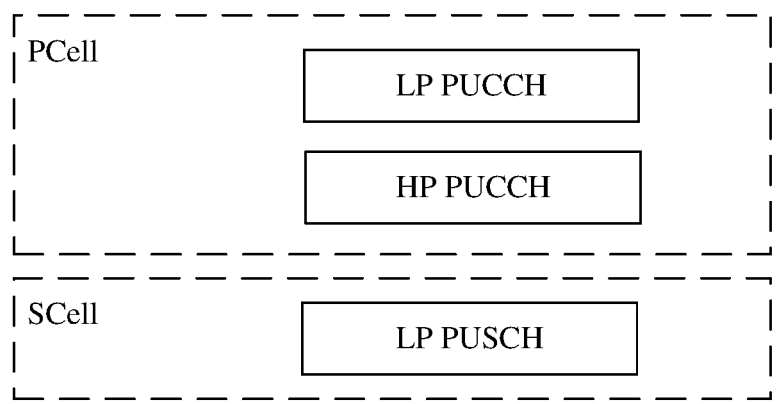
FIG. 3 is a schematic diagram showing a collision among one channel with the high priority (HP PUCCH) and two channels with the low priority (LP PUCCH and LP PUSCH).

Please refer to FIG. 3. FIG. 3 is a schematic diagram showing a collision among one channel with the high priority (HP PUCCH) and two channels with the low priority (LP PUCCH and LP PUSCH). Firstly, LP PUCCH can be multiplexed in LP PUSCH when the multiplexing condition is met. Then, HP PUCCH and LP PUSCH with LP PUCCH can be multiplexed when the multiplexing condition is met. When the multiplexing condition is not met and the simultaneous transmission condition is met, HP PUSCH and LP PUSCH with LP UCI can be simultaneously transmitted.

For the situation that the simultaneous PUCCH/PUSCH transmissions are considered firstly, when the final transmission channel with the low priority overlaps the at least one UL transmission channel with the high priority, the simultaneous PUCCH/PUSCH transmissions are performed in response to a simultaneous transmission condition being met. In detail, the final transmission channel with the low priority and the at least one UL transmission channel with the high priority are transmitted simultaneously.

When the final transmission channel with the low priority overlaps the at least one UL transmission channel with the high priority, the multiplexing of the final transmission channel with the low priority and the at least one UL transmission channel with the high priority is performed in response to the simultaneous transmission condition not being met and a multiplexing condition being met.

When the final transmission channel with the low priority overlaps the at least one UL transmission channel with the high priority, the final transmission channel with the low priority is dropped in response to the simultaneous transmission condition not being met and the multiplexing condition not being met.

Please refer to FIG. 3 again. In the present situation, LP PUCCH can be multiplexed in LP PUSCH when the multiplexing condition is met (operation S20). Then, HP PUCCH and LP PUSCH with LP PUCCH can be simultaneously transmitted. When the simultaneous PUCCH/PUSCH transmissions are not available, HP PUCCH and LP PUSCH with LP PUCCH can be multiplexed when the multiplexing condition is met. Otherwise, LP PUSCH should be dropped.

Figure 4:
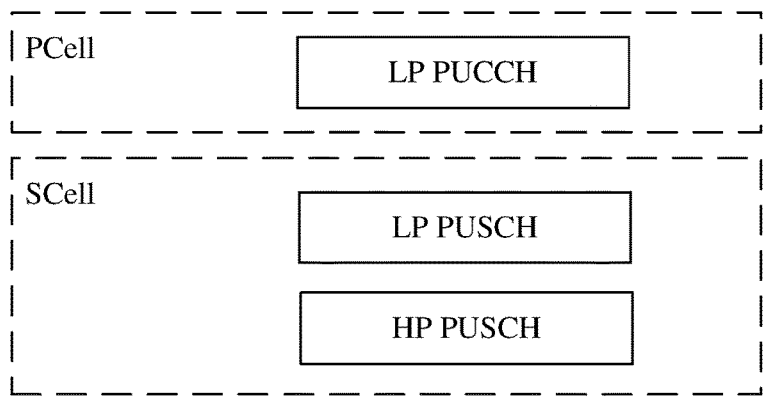
FIG. 4 is a schematic diagram showing a collision among one channel with the high priority (HP PUSCH) and two channels with the low priority (LP PUCCH and LP PUSCH).

In the above-mentioned two situations, the multiplexing between the same priority is performed firstly (operation S20), and then the multiplexing or the PUCCH/PUSCH simultaneous transmissions with different priorities are performed (operation S24). The difference between the above-mentioned two situations is the processing order between the multiplexing and the simultaneous PUCCH/PUSCH transmissions with different priorities. However, when the collision handling for the same priority or low priority uplink channels always comes first, this leads to unnecessary drop behaviour of low priority uplink channels. Please refer to FIG. 4. FIG. 4 is a schematic diagram showing a collision among one channel with the high priority (HP PUSCH) and two channels with the low priority (LP PUCCH and LP PUSCH). According to the processing order in the above-mentioned situations, LP PUCCH is multiplexed in LP PUSCH. Then, LP PUSCH with LP PUCCH is cancelled by HP PUSCH. That is, LP PUCCH and LP PUSCH cannot be transmitted. Considering the transmission reliability of low priority traffic or even high priority traffic, simultaneous PUCCH/PUSCH transmissions should be performed firstly. For example, when the simultaneous transmission in FIG. 4 is performed firstly, at least LP PUCCH can be transmitted, and LP PUSCH is cancelled by HP PUSCH. Therefore, in this situation, the primary consideration of the processing order is the simultaneous PUCCH/PUSCH transmissions.

In this situation, there is one condition should be followed that the simultaneous PUCCH/PUSCH transmissions are only supported for PUCCH/PUSCH with different priorities. That is to say, when the simultaneous PUCCH/PUSCH transmissions are enabled, the UL channels in a primary serving cell (PCell) and a secondary serving cell (SCell) should have different priorities. In summary, the first step in the processing order should be to perform the simultaneous PUCCH/PUSCH transmissions with different priorities.

Figure 5:
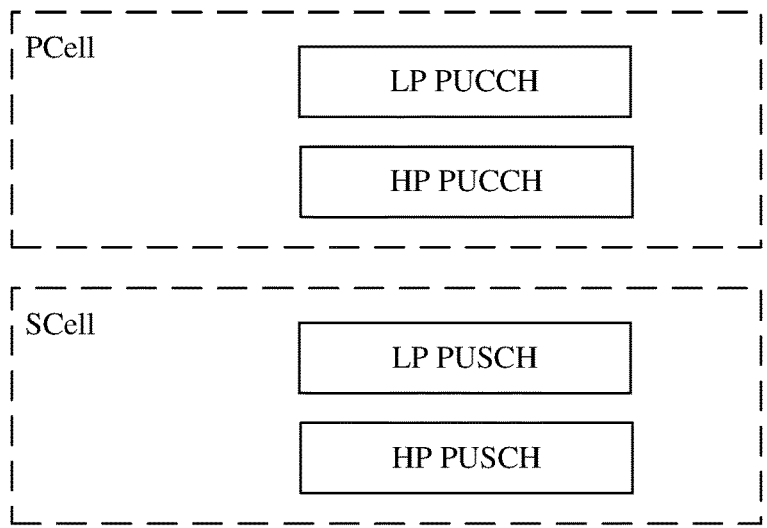
FIG. 5 is a schematic diagram showing a collision among two channels with the high priority (HP PUCCH and HP PUSCH) and two channels with the low priority (LP PUCCH and LP PUSCH).

One alternative solution to perform the simultaneous PUCCH/PUSCH transmissions is to configure the priority for each serving cell. In detail, a serving cell only supports a UL transmission with a specified priority. The mapping relationship between the serving cell and the priority is configurable. The mapping relationship can be configured by an RRC parameter or a downlink control information (DCI) format or configured by default. Please refer to FIG. 5. FIG. 5 is a schematic diagram showing a collision among two channels with the high priority (HP PUCCH and HP PUSCH) and two channels with the low priority (LP PUCCH and LP PUSCH). Assuming that the PCell is configured with the low priority UL transmission, and the SCell is configured with the high priority UL transmission. HP PUCCH in the PCell can be multiplexed with HP PUSCH in the SCell. LP PUSCH is cancelled by HP PUSCH. Therefore, LP PUCCH in the PCell and HP PUSCH with HP PUCCH can be transmitted simultaneously.

However, this mechanism may have one problem that if there is no low priority UL transmission in the PCell or the high priority UL transmission cannot be multiplexed or if the priority of the transmitted UL channel is fixed for each serving cell, this may lead to unnecessary drop behaviour. Therefore, for the serving cell that is configured with the low priority transmission, if there is no low priority UL transmission in this serving cell or the high priority UL transmission cannot be multiplexed with the UL transmission in other serving cell, the processing order should follow the mechanism described in embodiments with reference to FIGS. 2 and 3.

Figure 6:
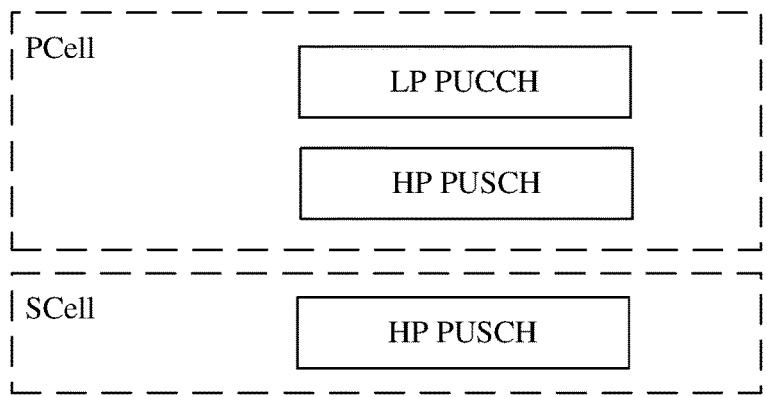
FIG. 6 is a schematic diagram showing a collision among one channel with the low priority (LP PUCCH) and two channels with the high priority (two HP PUSCHs).

In recent 3GPP specification, there is no conclusion that if the simultaneous PUCCH/PUSCH transmissions with the same priority can be supported. However, if the resulting UL channel in each serving cell is with the high priority, this may lead to negative impact to the reliability of an uplink transmission with the high priority. Please refer to FIG. 6. FIG. 6 is a schematic diagram showing a collision among one channel with the low priority (LP PUCCH) and two channels with the high priority (two HP PUSCHs). Assuming that LP PUCCH can be multiplexed with HP PUSCH in the PCell. If the simultaneous PUCCH/PUSCH transmissions are only supported for PUCCH/PUSCH with different priorities, the final HP PUSCH in the PCell and the HP PUSCH in SCell cannot be transmitted simultaneously because they have the same priority. Accordingly, prioritization procedure should be performed for the two HP PUSCHs.

To support the simultaneous PUCCH/PUSCH transmissions with the same priority is necessary especially for the high priority UL transmission. Hence, transmitting UL channels with the same priority simultaneously should be supported at least for high priority UL channels. In other words, when there is only one UL channel with the high priority to be transmitted in each serving cell, the high priority UL transmission can be transmitted simultaneously.

Regarding the processing order, when simultaneous PUCCH/PUSCH transmissions with the same priority and different priorities, one solution can be referred to embodiments with reference to FIGS. 2 and 3. Another solution is to perform the processing order in existing specification in each serving cell, and a final UL channel is obtained after the multiplexing or prioritization. As such, the final UL channels on different serving cells are allowed to be transmitted simultaneously.

With the new feature of the simultaneous PUCCH/PUSCH transmissions, one issue should be considered is that a power headroom reporting (PHR) procedure should be updated to support the new scenario. The existing specification for PHR procedure in TS 38.321 is as following.

---

The Power Headroom reporting procedure is used to provide the serving gNB with the following information:

Type 1 power headroom: the difference between the nominal UE maximum transmit power and the estimated power for UL-SCH transmission per activated Serving Cell;

-continued

Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);
Type 3 power headroom: the difference between the nominal UE maximum transmit power and the estimated power for SRS transmission per activated Serving Cell;
MPE P-MPR: the power backoff applied by the UE to meet the MPE FR2 requirements for a Serving Cell.

It should be mentioned that the existing Type2 power headroom is not specified in recent TS 38.213. For LTE Type2 PHR, the PHR is only for simultaneous PUCCH/PUSCH transmission on the same component carrier (CC), which does not support in NR yet. Therefore, the equation for Type2 power headroom needs to be updated for PUCCH only transmission.

Regarding the recent specification, the PHR report is only for a PUSCH transmission or a UL-SCH with PUCCH transmission. When the simultaneous PUCCH/PUSCH transmissions are supported, the PHR report for PUCCH only is required. For the new type of PHR, there are two optional solutions provided in the present disclosure. One solution is to reuse the existing Type 2 PHR with a minor modification. Another solution is to introduce a new type of PHR, for example type 4 PHR, to accommodate the new scenario.

If a UE determines that a Type 2 power headroom report for an activated serving cell is based on a PUCCH transmission without a PUSCH transmission (that is, at least one PUCCH transmission is transmitted and no PUSCH transmission is not transmitted), for an active uplink bandwidth part (UL BWP) b of carrier f in the primary cell c using PUCCH power control adjustment state with index l, the UE determines the PUCCH transmission power $P_{PUCCH,b,f,c}(i, q_u, q_d, l)$ in PUCCH transmission occasion i, the UE computes the enhanced Type 2 power headroom reporting report is calculated as following:

$$PH_{type2,b,f,c}(i, q_u, q_d, l) = $$

$$P_{CMAX,f,c}(i) - 10\log_{10}\left(10^{(P_{O\_PUCCH,b,f,c}(q_u)+10\log_{10}(2^\mu \cdot M_{RB,b,f,c}^{PUCCH}(i))+PL_{b,f,c}(q_d)+\Delta_{F\_PUCCH}(F)+\Delta_{TF,b,f,c}(i)+g_{b,f,c}(i,l))/10} + \right.$$

$$\left. 10^{(P_{O\_PUSCH,b,f,c}(j)+\alpha_{b,f,c}(j)+PL_{b,f,c}(q_d)+f_{b,f,c}(i,l))/10}\right),$$

where
$P_{CMAX,f,c}(i)$ is a UE configured maximum output power,
$P_{O\_PUCCH,b,f,c}(q_u)$ is a parameter composed of a sum of a component $P_{O\_NOMINAL\_PUCCH}(q_u)$, and a component $P_{O\_UE\_PUCCH}(q_u)$, $$M_{RB,b,f,c}^{PUCCH}(i)$$

is a bandwidth of a PUCCH resource assignment expressed in number of resource blocks for PUCCH transmission occasion i on active uplink bandwidth part (UL BWP) b of carrier f of primary cell c and μ is a SCS configuration,
$PL_{b,f,c}(q_d)$ is a downlink path loss estimate in dB calculated by the UE using RS resource index $q_d$,
$\Delta_{F\_PUCCH}(F)$ is a deltaF value which is configured by RRC information element PUCCH-PowerControl, and F is the PUCCH format index, $\Delta_{TF,b,f,c}(i)$ is a PUCCH transmission power adjustment component on active UL BWP b of carrier f of primary cell c,
$g_{b,f,c}(i,l)$ is a PUCCH power control adjustment state for active UL BWP b of carrier f of primary cell c and PUCCH transmission occasion i,
$P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ where $j \in \{0, 1, \ldots, J-1\}$,
For the value of $\alpha_{b,f,c}(j)$ can refer to the TS 39.213 Clause 7.1.1,
$PL_{b,f,c}(q_d)$ is a downlink path loss estimate in dB calculated by the UE using reference signal (RS) index $q_d$ for the active DL BWP, as described in Clause 12, of carrier f of serving cell c, and
$f_{b,f,c}(i,l)$ is a PUSCH power control adjustment state $f_{b,f,c}(i,l)$ for active UL BWP b of carrier f of serving cell c in PUSCH transmission occasion i.

The detailed introduction is defined in TS38.213 Clause 7. The scheduling procedure for Type2 PHR can follow the existing mechanism illustrated in TS 38.321. It is noted that if the simultaneous PUCCH/PUSCH transmissions are enabled and there is only PUCCH transmission transmitted in the corresponding serving cell, the above formula should be used for this scenario.

Another solution is to define a new type of PHR for the scenario that only a PUCCH transmission is transmitted. It is assumed that PUCCH is transmitted on a primary component carrier (PCC) and PUSCH is transmitted on a secondary component carrier (SCC). While there is PHR type for PUSCH transmission only, no PHR type for PUCCH transmission is defined in NR. Therefore, the new type of PHR, Type-4 PHR should be introduced. Based on the formula, the PH calculation for Type-4 PHR is as following:

$$PH_{type4,b,f,c}(i, q_u, q_d, l) = $$

$$P_{CMAX,f,c}(i) - \{P_{O\_PUCCH,b,f,c}(q_u) + 10\log_{10}(2^\mu \cdot M_{RB,b,f,c}^{PUCCH}(i)) + $$

$$PL_{b,f,c}(q_d) + \Delta_{F_{PUCCH}}(F) + \Delta_{TF,b,f,c}(i) + g_{b,f,c}(i,l)\}.$$

The parameter in the above-mentioned formula can be referred to the previous paragraph.

For the Type-4 PHR, the main concern is how to enabling the Type-4 PHR for the simultaneous PUCCH/PUSCH transmissions. One solution is to reuse the enabling configuration for the simultaneous PUCCH/PUSCH transmissions. Based on the agreement in RAN1 #104-e, the simultaneous PUCCH/PUSCH transmissions over different cells can be RRC configured within the same PUCCH group or dynamic indication is in discussion. If this enabling RRC or dynamic indication is configured, a default configuration can be defined. In other word, this indication has an additional meaning. If there is only PUCCH transmission transmitted in the corresponding serving cell, the Type-4 PHR is configured. This solution can save more signalling overhead and accommodate the new situation.

Another solution is to configure the type of PHR by RRC configuration, a new parameter phr-type can be introduced. This parameter can be indicated by PHR related information element, for example, the PHR-Config. The phr-type can be used to indicate all the PHR type. For example, when phr-type=0, it means the PHR type is Type-1. When phr-type=1, it means the PHR type is Type-2. To save more signalling overhead, another optional configuration is that phr-type is only for PUCCH PHR. When phr-type=0, it means the PHR type is enhanced Type-2. When phr-type=1, it means the PHR type is Type-4.

The present disclosure can solve the problem of multiplexing behaviour for collision(s) among uplink transmissions with different priorities. The present disclosure provides several alternative solutions for different scenarios including the processing order among multiplexing, prioritization and simultaneous PUCCH/PUSCH transmissions. In addition, the present disclosure provides new PHR types if simultaneous PUCCH/PUSCH transmissions are enabled. The wireless communication method, the user equipment, and the base station provided by the present disclosure can both guarantee the reliability and latency requirement of high priority transmission and improve the transmit performance of low priority transmission.

Figure 7:
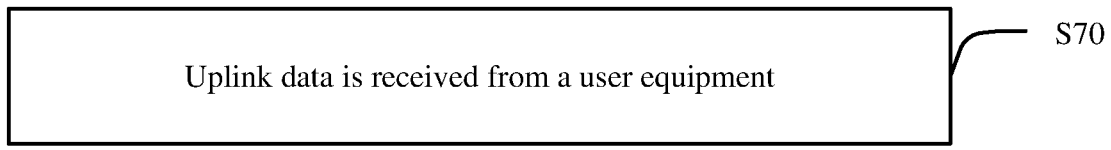
FIG. 7 is a schematic diagram showing a wireless communication method executable in a base station according to an embodiment of the present disclosure.

Please refer to FIG. 7. FIG. 7 is a schematic diagram showing a wireless communication method executable in a base station (BS) according to an embodiment of the present disclosure.

In operation S70, uplink data is received from a user equipment (UE).

The UE perform the operations S20-S24 in FIG. 2.

Figure 8:
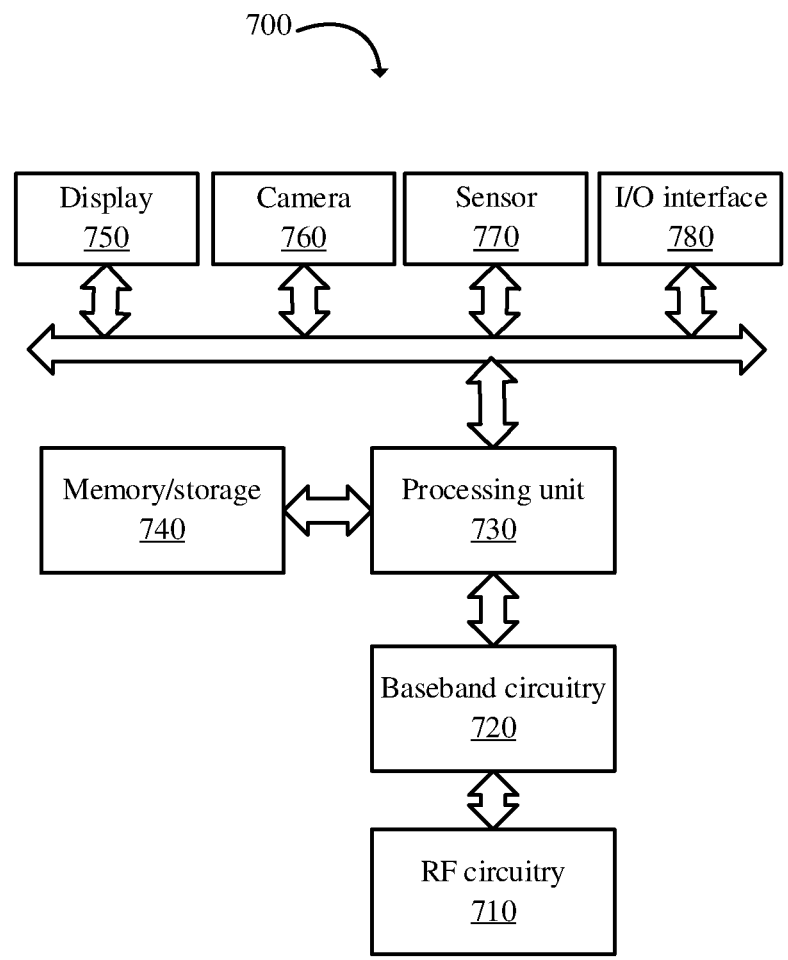
FIG. 8 is a block diagram of a system for wireless communication according to an embodiment of the present disclosure.

Please refer to FIG. 8. FIG. 8 is a block diagram of a system 700 for wireless communication according to an embodiment of the present disclosure. Embodiments described herein may be implemented into the system using any suitably configured hardware and/or software. FIG. 8 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system. The RF circuitry 710, baseband circuitry 720, processing unit 730, memory/storage 740, display 750, camera 760, sensor 770, and I/O interface 780 are well-known elements in the system 700 such as, but not limited to, a laptop computing device, a tablet computing device, a netbook, an ultrabook, a smartphone, etc. In addition, the instructions as a software product can be stored in a readable storage medium in a computer. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

The embodiment of the present disclosure is a combination of techniques/processes that can be adopted in 3GPP specification to create an end product.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method executable in a user equipment (UE), comprising:
performing multiplexing of at least two uplink (UL) transmission channels with a low priority;
determining a final transmission channel with the low priority after the multiplexing of the at least two UL transmission channels with the low priority; and
in response to the final transmission channel with the low priority overlapping at least one UL transmission channel with a high priority, performing multiplexing of the final transmission channel with the low priority and the at least one UL transmission channel with the high priority, or performing simultaneous PUCCH/PUSCH transmissions,
wherein when the final transmission channel with the low priority overlaps the at least one UL transmission channel with the high priority, the simultaneous PUCCH/PUSCH transmissions are performed in response to a simultaneous transmission condition being met;
wherein when the final transmission channel with the low priority overlaps the at least one UL transmission channel with the high priority, the multiplexing of the final transmission channel with the low priority and the at least one UL transmission channel with the high priority is performed in response to the simultaneous transmission condition not being met and a multiplexing condition being met.

2. The wireless communication method of claim 1, wherein when the final transmission channel with the low priority overlaps the at least one UL transmission channel with the high priority, the simultaneous PUCCH/PUSCH transmissions are performed in response to the multiplexing condition not being met and the simultaneous transmission condition being met.

3. The wireless communication method of claim 2, wherein when the final transmission channel with the low priority overlaps the at least one UL transmission channel with the high priority, the final transmission channel with the low priority is dropped in response to the multiplexing condition not being met and the simultaneous transmission condition not being met.

4. The wireless communication method of claim 1, wherein when the final transmission channel with the low priority overlaps the at least one UL transmission channel with the high priority, the final transmission channel with the low priority is dropped in response to the simultaneous transmission condition not being met and the multiplexing condition not being met.

5. The wireless communication method of claim 1, wherein when at least one PUCCH transmission is transmitted and no PUSCH transmission is not transmitted, a power headroom reporting report of the at least one PUCCH transmission is calculated as following:

$$PH_{type2,b,f,c}(i, q_u, q_d, l) =$$

$$P_{CMAX,f,c}(i) - 10\log_{10}\left(10^{(P_{O\_PUCCH,b,f,c}(q_u)+10\log_{10}(2^\mu \cdot M_{RB,b,f,c}^{PUCCH}(i))+PL_{b,f,c}(q_d)+\Delta_{F\_PUCCH}(F)+\Delta_{TF,b,f,c}(i)+g_{b,f,c}(i,l))/10} + 10^{(P_{O\_PUSCH,b,f,c}(j)+\alpha_{b,f,c}(j)+PL_{b,f,c}(q_d)+f_{b,f,c}(i,l))/10}\right),$$

where
$P_{CMAX,f,c}(i)$ is a UE configured maximum output power,
$P_{O\_PUCCH,b,f,c}(q_u)$ is a parameter composed of a sum of a component $P_{O\_NOMINAL\_PUCCH}(q_u)$, and a component $P_{O\_UE\_PUCCH}(q_u)$, $$M_{RB,b,f,c}^{PUCCH}(i)$$

is a bandwidth of a PUCCH resource assignment expressed in number of resource blocks for PUCCH transmission occasion i on active uplink bandwidth part (UL BWP) b of carrier f of primary cell c and μ is a SCS configuration,
$PL_{b,f,c}(q_d)$ is a downlink path loss estimate in dB calculated by the UE using RS resource index $q_d$,
$\Delta_{F\_PUCCH}(F)$ is a deltaF value which is configured by RRC information element PUCCH-PowerControl, and F is the PUCCH format index,
$\Delta_{TF,b,f,c}(i)$ is a PUCCH transmission power adjustment component on active UL BWP b of carrier f of primary cell c,
$g_{b,f,c}(i,l)$ is a PUCCH power control adjustment state for active UL BWP b of carrier f of primary cell c and PUCCH transmission occasion i,
$P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ where $j \in \{0, 1, \ldots, J-1\}$,
$PL_{b,f,c}(q_d)$ is a downlink path loss estimate in dB calculated by the UE using reference signal (RS) index $q_d$ for the active DL BWP of carrier f of serving cell c, and
$f_{b,f,c}(i,l)$ is a PUSCH power control adjustment state $f_{b,f,c}(i,l)$ for active UL BWP b of carrier f of serving cell c in PUSCH transmission occasion i.

6. The wireless communication method of claim 1, wherein when at least one PUCCH transmission is transmitted and no PUSCH transmission is not transmitted, a power headroom reporting report of the at least one PUCCH transmission is calculated as following:

$$PH_{type4,b,f,c}(i, q_u, q_d, l) =$$

$$P_{CMAX,f,c}(i) - \{P_{O\_PUCCH,b,f,c}(q_u) + 10\log_{10}(2^\mu \cdot M_{RB,b,f,c}^{PUCCH}(i)) + PL_{b,f,c}(q_d) + \Delta_{F_{PUCCH}}(F) + \Delta_{TF,b,f,c}(i) + g_{b,f,c}(i, l)\},$$

where
$P_{CMAX,f,c}(i)$ is a UE configured maximum output power,
$P_{O\_PUCCH,b,f,c}(q_u)$ is a parameter composed of a sum of a component $P_{O\_NOMINAL\_PUCCH}(q_u)$, and a component $P_{O\_UE\_PUCCH}(q_u)$, $$M_{RB,b,f,c}^{PUCCH}(i)$$

is a bandwidth of a PUCCH resource assignment expressed in number of resource blocks for PUCCH transmission occasion i on active uplink bandwidth part (UL BWP) b of carrier f of primary cell c and μ is a SCS configuration,
$PL_{b,f,c}(q_d)$ is a downlink path loss estimate in dB calculated by the UE using RS resource index $q_d$,
$\Delta_{F\_PUCCH}(F)$ is a deltaF value which is configured by RRC information element PUCCH-PowerControl, and F is the PUCCH format index,
$\Delta_{TF,b,f,c}(i)$ is a PUCCH transmission power adjustment component on active UL BWP b of carrier f of primary cell c,
$g_{b,f,c}(i,l)$ is a PUCCH power control adjustment state for active UL BWP b of carrier f of primary cell c and PUCCH transmission occasion i.

7. A wireless communication method executable in a base station (BS), comprising:
receiving uplink data from a user equipment (UE), wherein the UE performs operations comprising:
performing multiplexing of at least two uplink (UL) transmission channels with a low priority;
determining a final transmission channel with the low priority after the multiplexing of the at least two UL transmission channels with the low priority; and
in response to the final transmission channel with the low priority overlapping at least one UL transmission channel with a high priority, performing multiplexing of the final transmission channel with the low priority and the at least one UL transmission channel with the high priority, or performing PUCCH/PUSCH transmissions,
wherein when the final transmission channel with the low priority overlaps the at least one UL transmission channel with the high priority, the simultaneous PUCCH/PUSCH transmissions are performed in response to a simultaneous transmission condition being met;
wherein when the final transmission channel with the low priority overlaps the at least one UL transmission channel with the high priority, the multiplexing of the final transmission channel with the low priority and the at least one UL transmission channel with the high priority is performed in response to the simultaneous transmission condition not being met and a multiplexing condition being met.

8. The wireless communication method of claim 7, wherein when the final transmission channel with the low priority overlaps the at least one UL transmission channel with the high priority, the simultaneous PUCCH/PUSCH transmissions are performed in response to the multiplexing condition not being met and the simultaneous transmission condition being met.

9. The wireless communication method of claim 8, wherein when the final transmission channel with the low priority overlaps the at least one UL transmission channel with the high priority, the final transmission channel with the low priority is dropped in response to the multiplexing condition not being met and the simultaneous transmission condition not being met.

10. The wireless communication method of claim 7, wherein when the final transmission channel with the low priority overlaps the at least one UL transmission channel with the high priority, the final transmission channel with the low priority is dropped in response to the simultaneous transmission condition not being met and the multiplexing condition not being met.

11. The wireless communication method of claim 7, wherein when at least one PUCCH transmission is transmitted and no PUSCH transmission is not transmitted, a power headroom reporting report of the at least one PUCCH transmission is calculated as following:

$$PH_{type2,b,f,c}(i, q_u, q_d, l) =$$

$$P_{CMAX,f,c}(i) - 10\log_{10}\left(10^{\left(P_{O\_PUCCH,b,f,c}(q_u)+10\log_{10}\left(2^\mu \cdot M_{RB,b,f,c}^{PUCCH}(i)\right)+PL_{b,f,c}(q_d)+\Delta_{F\_PUCCH}(F)+\Delta_{TF,b,f,c}(i)+g_{b,f,c}(i,l)\right)/10} + \right.$$

$$\left. 10^{\left(P_{O\_PUSCH,b,f,c}(j)+\alpha_{b,f,c}(j)+PL_{b,f,c}(q_d)+f_{b,f,c}(i,l)/10\right)}\right),$$

where $P_{CMAX,f,c}(i)$ is a UE configured maximum output power, $P_{O\_PUCCH,b,f,c}(q_u)$ is a parameter composed of a sum of a component $P_{O\_NOMINAL\_PUCCH}(q_u)$, and a component $P_{O\_UE\_PUCCH}(q_u)$, $M_{RB,b,f,c}^{PUCCH}(i)$ is a bandwidth of a PUCCH resource assignment expressed in number of resource blocks for PUCCH transmission occasion i on active uplink bandwidth part (UL BWP) b of carrier f of primary cell c and μ is a SCS configuration, $PL_{b,f,c}(q_d)$ is a downlink path loss estimate in dB calculated by the UE using RS resource index $q_d$, $\Delta_{F\_PUCCH}(F)$ is a deltaF value which is configured by RRC information element PUCCH-PowerControl, and F is the PUCCH format index, $\Delta_{TF,b,f,c}(i)$ is a PUCCH transmission power adjustment component on active UL BWP b of carrier f of primary cell c, $g_{b,f,c}(i,l)$ is a PUCCH power control adjustment state for active UL BWP b of carrier f of primary cell c and PUCCH transmission occasion i, $P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ where $j \in \{0, 1, \ldots, J-1\}$, $PL_{b,f,c}(q_d)$ is a downlink path loss estimate in dB calculated by the UE using reference signal (RS) index $q_d$ for the active DL BWP of carrier f of serving cell c, and $f_{b,f,c}(i,l)$ is a PUSCH power control adjustment state $f_{b,f,c}(i,l)$ for active UL BWP b of carrier f of serving cell c in PUSCH transmission occasion i.

12. The wireless communication method of claim 7, wherein when at least one PUCCH transmission is transmitted and no PUSCH transmission is not transmitted, a power headroom reporting report of the at least one PUCCH transmission is calculated as following:

$$PH_{type4,b,f,c}(i, q_u, q_d, l) =$$

$$P_{CMAX,f,c}(i) - \{P_{O\_PUCCH,b,f,c}(q_u) + 10\log_{10}\left(2^\mu \cdot M_{RB,b,f,c}^{PUCCH}(i)\right) +$$

$$PL_{b,f,c}(q_d) + \Delta_{F_{PUCCH}}(F) + \Delta_{TF,b,f,c}(i) + g_{b,f,c}(i, l)\},$$

where $P_{CMAX,f,c}(i)$ is a UE configured maximum output power, $P_{O\_PUCCH,b,f,c}(q_u)$ is a parameter composed of a sum of a component $P_{O\_NOMINAL\_PUCCH}(q_u)$, and a component $P_{O\_UE\_PUCCH}(q_u)$, $M_{RB,b,f,c}^{PUCCH}(i)$ is a bandwidth of a PUCCH resource assignment expressed in number of resource blocks for PUCCH transmission occasion i on active uplink bandwidth part (UL BWP) b of carrier f of primary cell c and μ is a SCS configuration, $PL_{b,f,c}(q_d)$ is a downlink path loss estimate in dB calculated by the UE using RS resource index $q_d$, $\Delta_{F\_PUCCH}(F)$ is a deltaF value which is configured by RRC information element PUCCH-PowerControl, and F is the PUCCH format index, $\Delta_{TF,b,f,c}(i)$ is a PUCCH transmission power adjustment component on active UL BWP b of carrier f of primary cell c, $g_{b,f,c}(i,l)$ is a PUCCH power control adjustment state for active UL BWP b of carrier f of primary cell c and PUCCH transmission occasion i.

13. A user equipment, comprising:
a transceiver; and
a processor connected with the transceiver and configured to execute operations comprising:
performing multiplexing of at least two uplink (UL) transmission channels with a low priority;
determining a final transmission channel with the low priority after the multiplexing of the at least two UL transmission channels with the low priority; and
in response to the final transmission channel with the low priority overlapping at least one UL transmission channel with a high priority, performing multiplexing of the final transmission channel with the low priority and the at least one UL transmission channel with the high priority, or performing PUCCH/PUSCH transmissions,
wherein when the final transmission channel with the low priority overlaps the at least one UL transmission channel with the high priority, the simultaneous PUCCH/PUSCH transmissions are performed in response to a simultaneous transmission condition being met;

wherein when the final transmission channel with the low priority overlaps the at least one UL transmission channel with the high priority, the multiplexing of the final transmission channel with the low priority and the at least one UL transmission channel with the high priority is performed in response to the simultaneous transmission condition not being met and a multiplexing condition being met.

14. The user equipment of claim 13, wherein when the final transmission channel with the low priority overlaps the at least one UL transmission channel with the high priority, the simultaneous PUCCH/PUSCH transmissions are performed in response to the multiplexing condition not being met and the simultaneous transmission condition being met.

15. The user equipment of claim 14, wherein when the final transmission channel with the low priority overlaps the at least one UL transmission channel with the high priority, the final transmission channel with the low priority is dropped in response to the multiplexing condition not being met and the simultaneous transmission condition not being met.

16. The user equipment of claim 13, wherein when the final transmission channel with the low priority overlaps the at least one UL transmission channel with the high priority, the final transmission channel with the low priority is dropped in response to the simultaneous transmission condition not being met and the multiplexing condition not being met.

17. The user equipment of claim 13, wherein when at least one PUCCH transmission is transmitted and no PUSCH transmission is not transmitted, a power headroom reporting report of the at least one PUCCH transmission is calculated as following:

$$PH_{type2,b,f,c}(i, q_u, q_d, l) =$$

$$P_{CMAX,f,c}(i) - 10\log_{10}\Big(10^{(P_{O\_PUCCH,b,f,c}(q_u)+10\log_{10}(2^{\mu}\cdot M_{RB,b,f,c}^{PUCCH}(i))+PL_{b,f,c}(q_d)+\Delta_{F\_PUCCH}(F)+\Delta_{TF,b,f,c}(i)+g_{b,f,c}(i,l))/10}$$

$$10^{(P_{O\_PUSCH,b,f,c}(j)+\alpha_{b,f,c}(j)+PL_{b,f,c}(q_d)+f_{b,f,c}(i,l))/10}\Big),$$

where $P_{CMAX,f,c}(i)$ is a UE configured maximum output power, $P_{O\_PUCCH,b,f,c}(q_u)$ is a parameter composed of a sum of a component $P_{O\_NOMINAL\_PUCCH}(q_u)$, and a component, $P_{O\_UE\_PUCCH}(q_u)$, $M_{RB,b,f,c}^{PUCCH}(i)$ is a bandwidth of a PUCCH resource assignment expressed in number of resource blocks for PUCCH transmission occasion i on active uplink bandwidth part (UL BWP) b of carrier f of primary cell c and μ is a SCS configuration, $PL_{b,f,c}(q_d)$ is a downlink path loss estimate in dB calculated by the UE using RS resource index $q_d$, $\Delta_{F\_PUCCH}(F)$ is a deltaF value which is configured by RRC information element PUCCH-PowerControl, and F is the PUCCH format index, $\Delta_{TF,b,f,c}(i)$ is a PUCCH transmission power adjustment component on active UL BWP b of carrier f of primary cell c, $g_{b,f,c}(i,l)$ is a PUCCH power control adjustment state for active UL BWP b of carrier f of primary cell c and PUCCH transmission occasion i, $P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ where j∈{0, 1, ..., J−1}, $PL_{b,f,c}(q_d)$ is a downlink path loss estimate in dB calculated by the UE using reference signal (RS) index $q_d$ for the active DL BWP of carrier f of serving cell c, and $f_{b,f,c}(i,l)$ is a PUSCH power control adjustment state $f_{b,f,c}(i,l)$ for active UL BWP b of carrier f of serving cell c in PUSCH transmission occasion i.

18. The wireless communication method of claim 13, wherein when at least one PUCCH transmission is transmitted and no PUSCH transmission is not transmitted, a power headroom reporting report of the at least one PUCCH transmission is calculated as following:

$$PH_{type4,b,f,c}(i, q_u, q_d, l) =$$

$$P_{CMAX,f,c}(i) - \{P_{O\_PUCCH,b,f,c}(q_u) + 10\log_{10}(2^{\mu}\cdot M_{RB,b,f,c}^{PUCCH}(i)) +$$

$$PL_{b,f,c}(q_d) + \Delta_{F_{PUCCH}}(F) + \Delta_{TF,b,f,c}(i) + g_{b,f,c}(i,l)\},$$

where $P_{CMAX,f,c}(i)$ is a UE configured maximum output power, $P_{O\_PUCCH,b,f,c}(q_u)$ is a parameter composed of a sum of a component $P_{O\_NOMINAL\_PUCCH}(q_u)$, and a component $P_{O\_UE\_PUCCH}(q_u)$, $M_{RB,b,f,c}^{PUCCH}(i)$ is a bandwidth of a PUCCH resource assignment expressed in number of resource blocks for PUCCH transmission occasion i on active uplink bandwidth part (UL BWP) b of carrier f of primary cell c and μ is a SCS configuration, $PL_{b,f,c}(q_d)$ is a downlink path loss estimate in dB calculated by the UE using RS resource index $q_d$, $\Delta_{F\_PUCCH}(F)$ is a deltaF value which is configured by RRC information element PUCCH-PowerControl, and F is the PUCCH format index, $\Delta_{TF,b,f,c}(i)$ is a PUCCH transmission power adjustment component on active UL BWP b of carrier f of primary cell c, $g_{b,f,c}(i,l)$ is a PUCCH power control adjustment state for active UL BWP b of carrier f of primary cell c and PUCCH transmission occasion i.

\* \* \* \* \*